(12) United States Patent (10) Patent No.: US 12,627,192 B2
Tanabe et al. (45) Date of Patent: May 12, 2026

(54) PERMANENT MAGNET ELECTRIC MOTOR

(71) Applicant: FUJITSU GENERAL LIMITED, Kanagawa (JP)

(72) Inventors: Yoichi Tanabe, Kanagawa (JP); Tomonori Kojima, Kanagawa (JP); Yosuke Matsui, Kanagawa (JP); Rei Omata, Kanagawa (JP); Hiroo Kojima, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 230 days.

(21) Appl. No.: 17/914,989

(22) PCT Filed: Mar. 24, 2021

(86) PCT No.: PCT/JP2021/012247
§ 371 (c)(1),
(2) Date: Sep. 27, 2022

(87) PCT Pub. No.: WO2021/200475
PCT Pub. Date: Oct. 7, 2021

(65) Prior Publication Data
US 2023/0155443 A1 May 18, 2023

(30) Foreign Application Priority Data
Mar. 31, 2020 (JP) ................................. 2020-063644

(51) Int. Cl.
*H02K 5/173* (2006.01)
*F16C 32/04* (2006.01)
(Continued)

(52) U.S. Cl.
CPC ......... *H02K 5/1732* (2013.01); *F16C 32/047* (2013.01); *H02K 1/30* (2013.01);
(Continued)

(58) Field of Classification Search
CPC .. H02K 5/02; H02K 5/04; H02K 5/08; H02K 5/124; H02K 5/15; H02K 5/16;
(Continued)

(56) References Cited

U.S. PATENT DOCUMENTS 5,497,040 A * 3/1996 Sato ........................ H02K 1/187
310/90
5,844,338 A * 12/1998 Horski ................... H02K 11/33
310/90
(Continued)

FOREIGN PATENT DOCUMENTS

CN        109075681 A  * 12/2018  ............. H02K 1/148
EP          1267475 A2 * 12/2002  ............. H02K 17/20
(Continued)

OTHER PUBLICATIONS

WO2019199056A1—Translation (Year: 2024).*
WO2019119803A1—Translation (Year: 2024).*
JP2011109861A—Translation (Year: 2024).*

*Primary Examiner* — Christopher M Koehler
*Assistant Examiner* — Ahmed F Seck
(74) *Attorney, Agent, or Firm* — Paratus Law Group, PLLC

(57) ABSTRACT

There is provided a permanent magnet electric motor that can be downsized in a rotation axis direction and can also suppress a leakage flux. The permanent magnet electric motor includes: a columnar rotor including a permanent magnet portion annularly disposed; a shaft disposed along a rotation axis of the rotor; a cylindrical stator core disposed on an outer circumferential side of the rotor; a main body including a shell integrally formed with the stator core; a bracket attached to one end side of the main body; and a bearing that rotatably supports the shaft. The bracket includes a bearing house portion that stores the bearing, and a non-magnetic portion that is connected to the bearing (Continued)

house portion. The bearing house portion is disposed on an inner diameter side relative to the permanent magnet portion as viewed from an axis direction of the rotation axis, and an edge portion of the bearing house portion on an outer diameter side is covered with the non-magnetic portion.

8 Claims, 5 Drawing Sheets

(51) Int. Cl.
    *H02K 1/30*         (2006.01)
    *H02K 7/08*         (2006.01)
    *H02K 21/14*       (2006.01)
(52) U.S. Cl.
    CPC ............. *H02K 7/083* (2013.01); *H02K 21/14* (2013.01); *F16C 2380/26* (2013.01)
(58) Field of Classification Search
    CPC ...... H02K 5/161; H02K 5/163; H02K 5/1672; H02K 5/1675; H02K 5/1677; H02K 5/173; H02K 5/1732; H02K 5/1735; H02K 5/1737; H02K 1/30; H02K 1/06; H02K 1/18; H02K 1/2706; H02K 7/083; H02K 7/085; H02K 7/086; H02K 21/14; H02K 21/10; H02K 21/12; H02K 21/28; H02K 11/00; F16C 32/047; F16C 32/0459; F16C 32/0467; F16C 32/0468; F16C 2380/26
    See application file for complete search history.

(56)               References Cited

U.S. PATENT DOCUMENTS

| | | | | |
|---|---|---|---|---|
| 2002/0190595 A1 * | 12/2002 | Han | .......................... | H02K 1/22 |
| | | | | 310/162 |
| 2014/0145564 A1 | 5/2014 | Taniguchi et al. | | |
| 2017/0155305 A1 * | 6/2017 | Takayama | .............. | H02K 11/40 |
| 2019/0036385 A1 * | 1/2019 | Oikawa | .................... | H02K 1/27 |

FOREIGN PATENT DOCUMENTS

| | | | | | |
|---|---|---|---|---|---|
| JP | 2011109861 A | * | 6/2011 | ............. | H02K 11/00 |
| JP | 2014-107973 A | | 6/2014 | | |
| JP | 2018-137864 A | | 8/2018 | | |
| JP | 2020-028203 A | | 2/2020 | | |
| KR | 102583066 B1 | * | 9/2023 | ........... | H02K 1/2786 |
| WO | WO-2019119803 A1 | * | 6/2019 | .............. | H02K 7/14 |
| WO | WO-2019199056 A1 | * | 10/2019 | ........... | H02K 1/2791 |

* cited by examiner

PERMANENT MAGNET ELECTRIC MOTOR

CROSS REFERENCE TO PRIOR APPLICATION

This application is a National Stage Patent Application of PCT International Patent Application No. PCT/JP2021/012247 (filed on Mar. 24, 2021) under 35 U.S.C. § 371, which claims priority to Japanese Patent Application No. 2020-063644 (filed on Mar. 31, 2020), which are all hereby incorporated by reference in their entirety.

TECHNICAL FIELD

The present invention relates to an inner-rotor permanent magnet electric motor including a rotor disposed coaxially with a cylindrical stator on the inner diameter side of the stator.

BACKGROUND ART

As an electric motor, an inner-rotor permanent magnet electric motor has been conventionally known, in which a columnar rotor including a permanent magnet portion is disposed coaxially with a cylindrical stator, which generates a rotating magnetic field, on the inner diameter side of the cylindrical stator.

This type of permanent magnet electric motor includes a permanent magnet electric motor including: a rotor including an annular permanent magnet portion facing a stator in a radial direction; and a coupling portion (yoke) that couples the permanent magnet portion to a shaft. In the permanent magnet electric motor of Patent Literature 1, a bearing house portion (bearing bracket) that holds a bearing is disposed close to the rotor in the axis direction of the stator, so that the electric motor is downsized in the axis direction.

CITATION LIST

Patent Literature

Patent Literature 1: Japanese Patent Application Laid-open No. 2011-109861

DISCLOSURE OF INVENTION

Technical Problem

However, there has been a problem that, if the bearing house portion (bearing bracket) formed of a magnetic substance is disposed close to the permanent magnet portion of the rotor, the magnetic flux flowing from the permanent magnet portion of the rotor to the yoke (coupling portion) side of the stator also flows to the bearing house portion side, and a leakage flux increases, so that the output of the permanent magnet electric motor is lowered.

Advantageous Effects of Invention

In this regard, it is an object of the present invention to provide a permanent magnet electric motor that can be downsized in an axis direction and can suppress a leakage flux.

Solution to Problem

According to an aspect of the present invention, there is provided a permanent magnet electric motor including: a columnar rotor including a permanent magnet portion annularly disposed; a shaft disposed along a rotation axis of the rotor; a cylindrical stator core disposed on an outer circumferential side of the rotor; a main body including a shell integrally formed with the stator core; a bracket attached to one end side of the main body; and a bearing that rotatably supports the shaft.

The bracket includes a bearing house portion that stores the bearing, and a non-magnetic portion that is connected to the bearing house portion.

The bearing house portion is disposed on an inner diameter side relative to the permanent magnet portion as viewed from an axis direction of the rotation axis.

An edge portion of the bearing house portion on an outer diameter side is covered with the non-magnetic portion.

According to the present invention, it is possible to downsize an electric motor in an axis direction of a rotation axis and to suppress a leakage flux flowing from a permanent magnet portion of a rotor to a bearing house portion side.

MODE(S) FOR CARRYING OUT THE INVENTION

Next, an embodiment of the present invention will be described with reference to the drawings. In the following description about the drawings, the same or similar portions will be denoted by the same or similar reference symbols. It should be noted that the drawings are schematic and may differ from reality. Therefore, specific constituent parts should be determined by referring to the following description.

Further, the embodiment to be described below exemplifies apparatuses and methods for embodying the technical idea of the present invention, and the technical idea of the present invention does not specify the shape, structure, arrangement, and the like of the constituent parts to those described below. Various modifications can be made to the technical idea of the present invention within the technical scope defined by the claims.

Hereinafter, an electric motor according to an embodiment of the present invention will be described.

Overall Configuration of Electric Motor

FIGS. 1 to 5 are views for describing a configuration of a permanent magnet electric motor 1 of this embodiment. As shown in those figures, the permanent magnet electric motor 1 is a brushless DC motor, for example. The permanent magnet electric motor 1 is, for example, used to rotationally drive a blower fan mounted in an outdoor unit of an air conditioner, though not shown in the figures.

Figure 1:
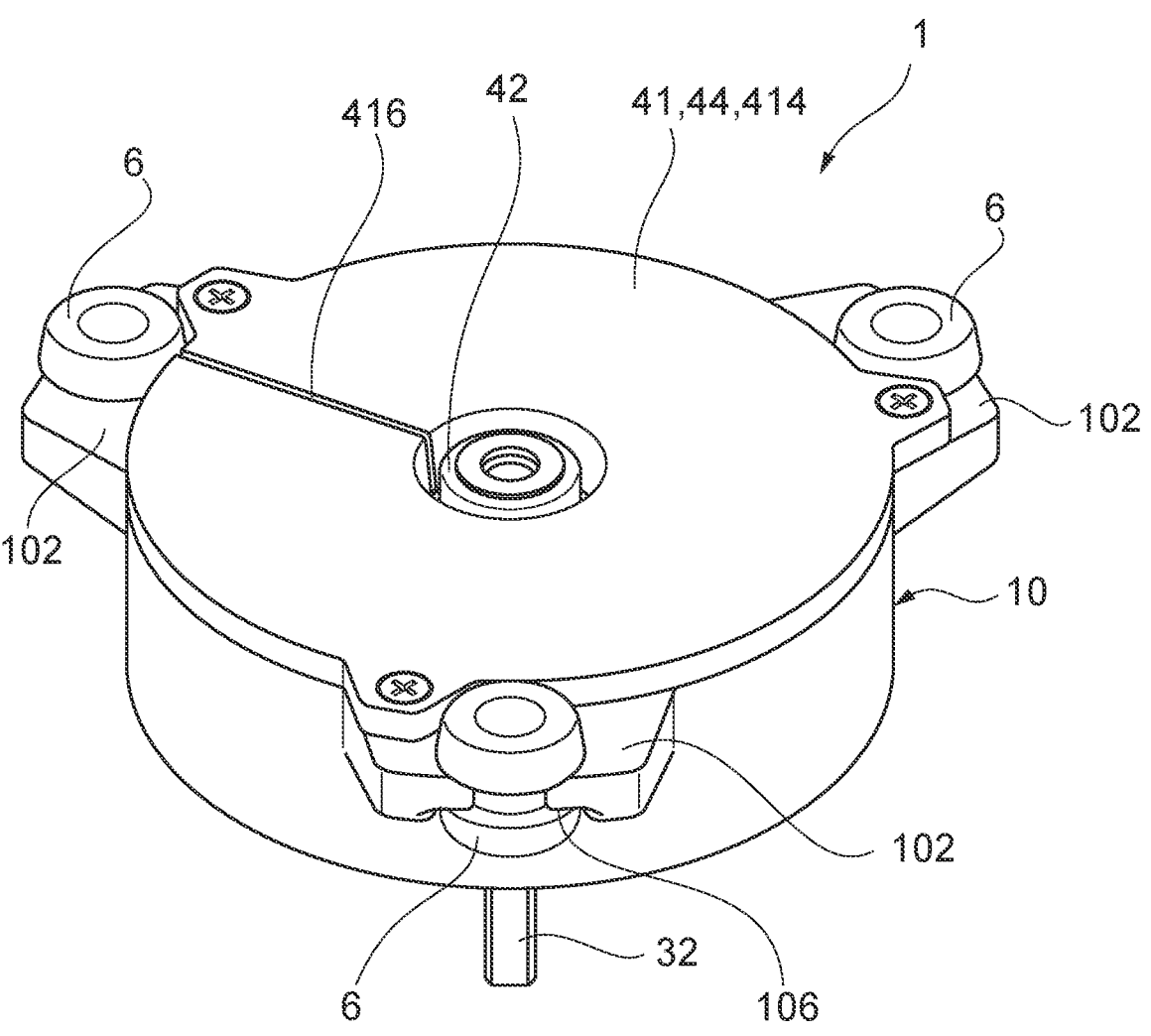
FIG. 1 is an overall perspective view of a permanent magnet electric motor according to the present invention.
Figure 2:
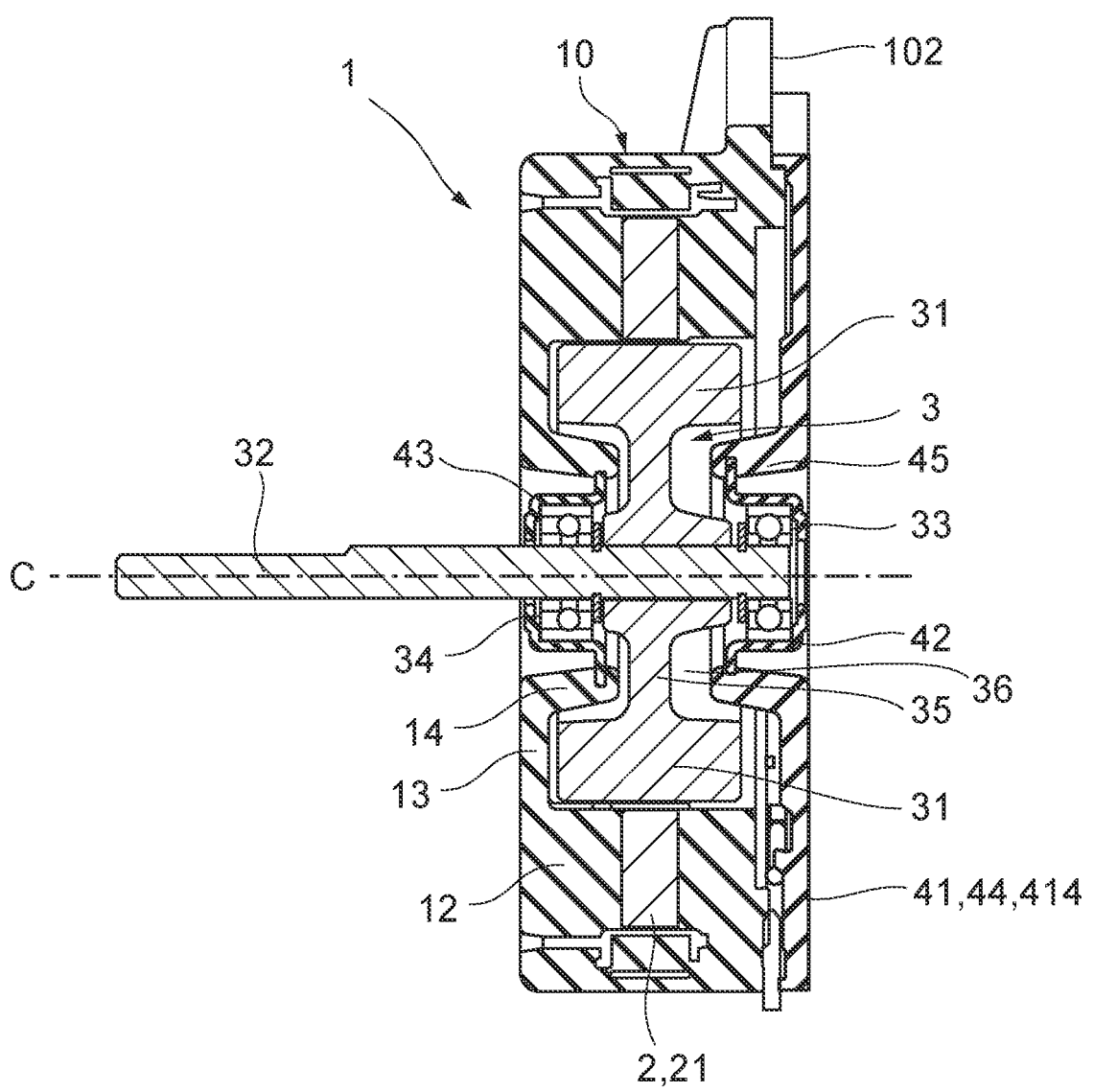
FIG. 2 is a transverse cross-sectional view of the permanent magnet electric motor according to the present invention.

As shown in FIGS. 1 and 2, the permanent magnet electric motor 1 of this embodiment includes a stator 2, a rotor 3, a motor shell (casing, main body) 10, and a bracket 41.

Hereinafter, an inner-rotor permanent magnet electric motor 1 will be described as an example, in which a columnar rotor 3 including a permanent magnet portion 31 is rotatably disposed inward in the radial direction of a cylindrical stator 2 that generates a rotating magnetic field.

Rotor, Stator, and Motor Shell

As shown in FIG. 2, the rotor 3 includes an annular permanent magnet portion 31 and a coupling portion 35, which is disposed on the inner diameter side relative to the permanent magnet portion 31 and couples the permanent magnet portion 31 and a shaft 32 to each other. The shaft 32 is fixed to the columnar rotor 3 along the center axis of the rotor 3. In this embodiment, the permanent magnet portion 31 and the coupling portion 35 of the rotor 3 are formed by integral molding of a resin material in which a ferrite magnetic substance is mixed. After the molding, only the permanent magnet portion 31 is magnetized to cause the permanent magnet portion 31 to function as a ferrite bonded magnet. Further, the permanent magnet portion 31 is magnetized to be a polar anisotropic magnet in which a south pole and a north pole alternately appear in the circumferential direction thereof. Thus, a part of a yoke for concentrating the flow of the magnetic flux of the permanent magnet portion 31 becomes unnecessary, and the leakage flux can be suppressed.

Note that the permanent magnet portion 31 and the coupling portion 35 may be formed separately. For example, the rotor 3 may be a so-called surface magnet (SPM) rotor, in which a plurality of ferrite sintered magnets (corresponding to the permanent magnet portion 31), which are obtained by sintering a powder-like ferrite magnetic substance in a mold, are annularly attached to the outer circumferential surface of a rotor core (corresponding to the coupling portion 35).

The stator 2 includes a stator core 21 including a cylindrical yoke portion (not shown) and a plurality of teeth portions (not shown) extending from the yoke portion to the inner diameter side, and winding (not shown) wound around the teeth portion via an insulator. The stator 2 is covered with the motor shell 10 (main body) formed of resin by resin integral molding, except for the inner circumferential surface of the stator core 21 (see FIGS. 2 and 4). Specifically, the motor shell 10 covers the stator 2 including the stator core 21 and the winding. As shown in FIGS. 1 and 2, the stator 2 is disposed on the outer circumferential side of the rotor 3 (outward in the radial direction of the permanent magnet electric motor 1). Further, the stator core 21 of the stator 2 is disposed such that the teeth portion of the stator core 21 faces the permanent magnet portion 31 of the rotor 3 in the radial direction. In other words, the stator 2 is disposed such that the annular permanent magnet portion 31 of the rotor 3 faces the stator core 21 of the stator 2 in the radial direction.

The motor shell 10 may have any shape. For example, the motor shell 10 may be formed into a hollow cylindrical shape having an open end surface on one side (in the embodiment, the opposite output side of the shaft 32) in the axis direction of the center axis of the permanent magnet electric motor 1, that is, the rotation axis of the rotor 3 (hereinafter, rotation axis C). In this embodiment, the motor shell 10 includes an annular portion 12 and an end surface portion 13 formed at the end portion of the annular portion 12 on the opposite side of the opening.

Figure 4:
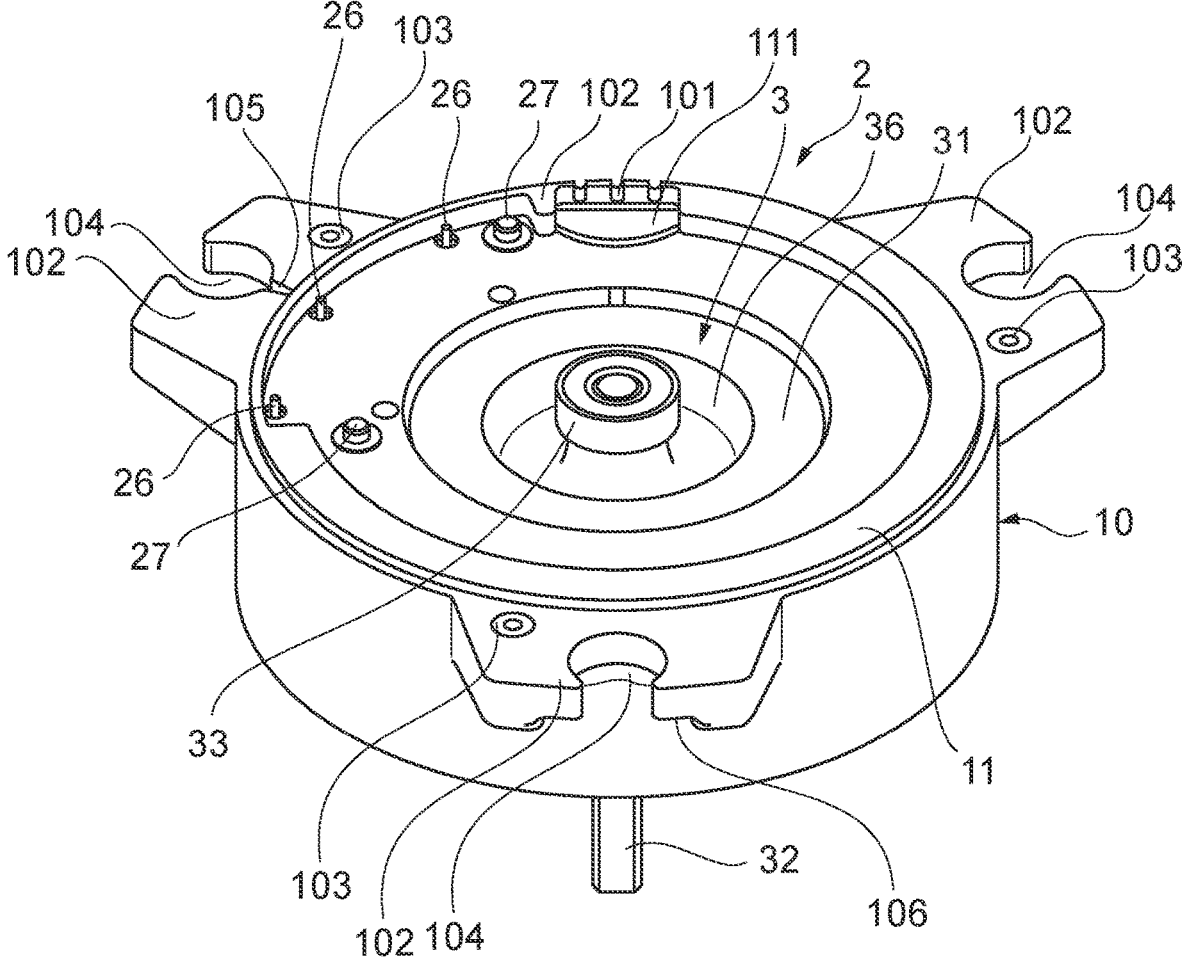
FIG. 4 is an overall perspective view of the permanent magnet electric motor according to the present invention, showing a state in which the bracket of FIG. 3 is removed.
Figure 5:
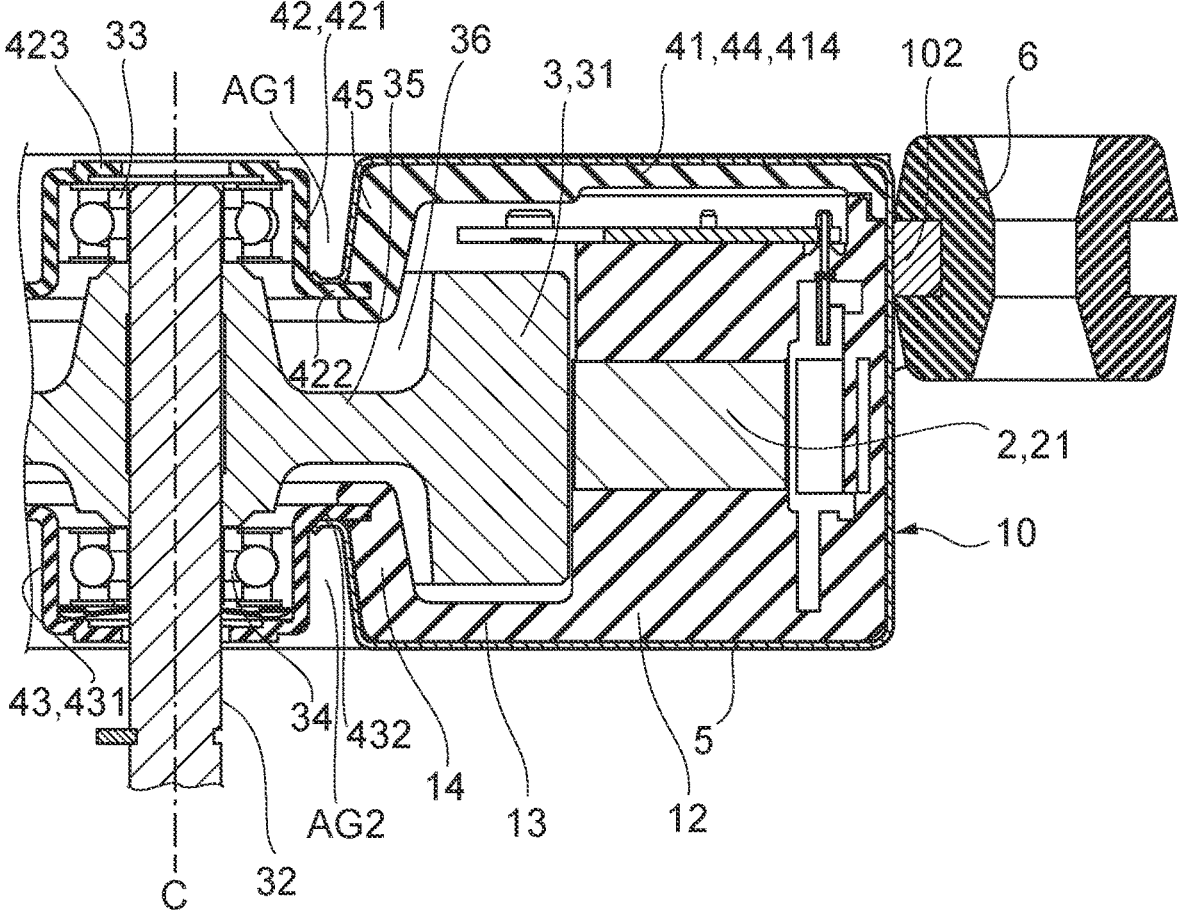
FIG. 5 is a cross-sectional view of a cross-section taken along a slitted groove shown in FIG. 1.

The rotor 3 is rotatably disposed on the inner circumferential side of the stator core 21 of the stator 2 with a predetermined clearance (gap) from the stator core 21. As shown in FIGS. 2, 4, and 5, the permanent magnet portion 31 formed in an annular shape is disposed on the outer side (outer circumference side) in the radial direction of the rotor 3 so as to face the stator core 21.

The rotor 3 is fixed to the circumference of the shaft 32. The shaft 32 is rotatably supported (held) by a first bearing 33 and a second bearing 34 fixed to the outer circumferential surface of the shaft 32. Further, the first bearing 33 is stored (held) in a first bearing storing portion 42 (bearing house portion) to be described later, and the second bearing 34 is stored (held) in a second bearing storing portion 43 to be described later, so that the rotor 3 is rotatably supported. The first bearing storing portion 42 and the second bearing storing portion 43 are formed of, for example, a magnetic substance of chromium-nickel-based stainless steel.

Bearing, Bracket, and Bearing House Portion

As shown in FIGS. 2, 4, and 5, the first bearing 33 is fixed to one end side (opposite output side) of the shaft 32 at the inner race side of the first bearing 33. The second bearing 34 is fixed to the other end side (output side) of the shaft 32 at the inner race side of the second bearing 34. The first bearing 33 and the second bearing 34 (a pair of bearings) cooperate to rotatably support the shaft 32 and the rotor 3 fixed to the shaft 32. For example, a ball bearing is used for each of the first bearing 33 and the second bearing 34.

The bracket 41 includes the first bearing storing portion 42 that is formed of a magnetic substance and stores the first bearing 33, and a non-magnetic portion 44 (end surface portion) formed of a non-magnetic substance (e.g., resin). In the motor shell 10 (main body) of the permanent magnet electric motor 1, the bracket 41 is disposed at an end in the rotation axis C direction, that is, disposed on the opposite output side of the shaft 32. The non-magnetic portion 44 of the bracket 41 includes a connection portion 45 connected to the first bearing storing portion 42 (see FIGS. 2, 3, and 5). The non-magnetic portion 44 of the bracket 41 is integrally formed with the first bearing storing portion 42, which is a magnetic portion, by insert molding. The non-magnetic portion 44 is connected to the first bearing storing portion 42 (bearing house portion) at the connection portion 45. The bracket 41 is attached to the end portion of the motor shell 10 (main body) on the opposite output side by using screws to serve as a lid for covering the opening of the motor shell 10 (main body). Note that the opening of the motor shell 10 may be provided toward the output side. In this case, the bracket 41 is disposed not on the opposite output side of the shaft 32 but on the output side of the shaft 32.

The non-magnetic portion 44 (end surface portion) of the bracket 41 is formed into a substantially circular plate shape having the outer shape in the radial direction, which expands to the outer circumferential surface of the motor shell 10 in the radial direction. The non-magnetic portion 44 of the bracket 41 forms a resin shell of the permanent magnet electric motor 1 together with the motor shell 10. Additionally, the non-magnetic portion 44 includes protrusions 410, which protrude outward in the radial direction relative to the outer circumferential surface of the motor shell 10, as viewed from the rotation axis C direction. The protrusions 410 each abut on the basal end portion of a guard portion 102 of the motor shell 10. The guard portion 102 will be described later.

The protrusions 410 of the bracket 41 are formed as many as the guard portions 102 provided to the motor shell 10 (three positions). For example, the protrusions 410 are each formed into a trapezoid as viewed from the rotation axis C direction and each include, at the center portion thereof, a screw through hole 413 penetrating in the rotation axis C direction.

Figure 3:
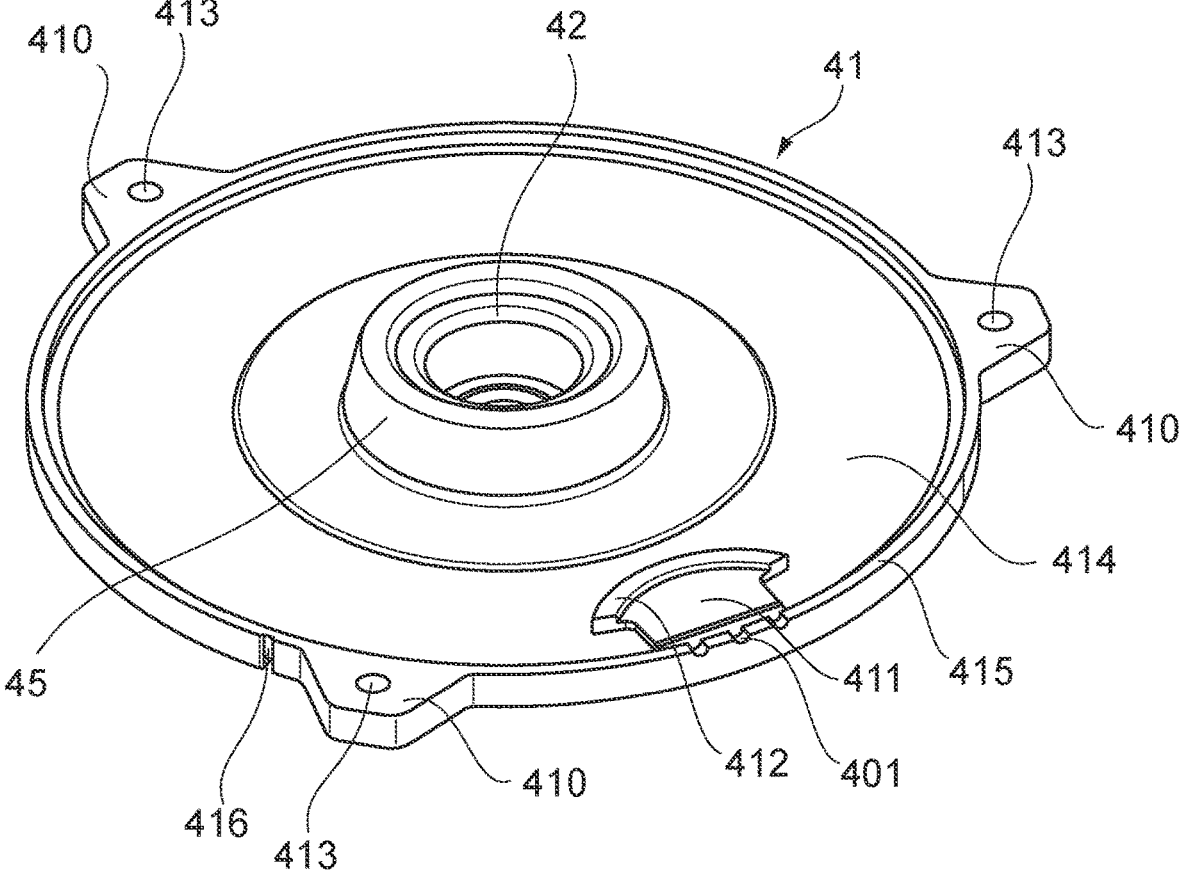
FIG. 3 is a perspective view of a bracket of the permanent magnet electric motor according to the present invention.

Note that the bracket 41 includes a slitted groove 416 for providing an electrically conductive member 5 for measures against electrolytic corrosion, which will be described later, in the outer surface exposed to the outside in the permanent magnet electric motor 1 after assembling (see FIGS. 1 and 3).

The slitted groove 416 extends outward in the radial direction from the center portion of the bracket 41 (tubular connection portion 45 of the non-magnetic portion 44 to be described later) to the outer circumferential surface of the bracket 41, and further extends in the axis direction from there to the position abutting on the motor shell 10.

The bracket 41 is fitted into the motor shell 10 (main body) and then screwed at screw holes 103 (to be described later) of the guard portions 102 of the motor shell 10 via the screw through holes 413 (see FIG. 1).

Further, the first bearing storing portion (bearing house portion) 42 for storing the first bearing 33 on the inner side (output side) of the permanent magnet electric motor 1 is disposed at the center portion of the circular plate shape bracket 41. The first bearing storing portion 42 is formed into, for example, a substantially bottomed cylindrical shape by press working.

The second bearing storing portion (bearing house portion) 43 for storing the second bearing 34 on the inner side (opposite output side) of the permanent magnet electric motor 1 is disposed at the center portion of the output side end portion of the motor shell 10. The second bearing storing portion 43 is formed into, for example, a substantially bottomed cylindrical shape similarly to the first bearing storing portion 42.

The second bearing storing portion 43 is disposed inward (inner diameter side) relative to the annular permanent magnet portion 31 in the radial direction of the rotor 3. The end surface portion 13 of the motor shell 10 includes a connection portion 14 that is connected to a flange portion 432 (to be described later) of the second bearing storing portion 43.

As shown in FIGS. 2 and 5, the first bearing storing portion (bearing house portion) 42 includes a tubular portion 421 that holds the outer race side of the first bearing 33 from the radial direction, an annular flange portion 422 that extends outward in the radial direction of the rotor 3 from one end portion of the tubular portion 421 in the rotation axis C direction, and a coronal portion 423 that extends inward in the radial direction from the other end portion of the tubular portion 421 in the rotation axis C direction. The coronal portion 423 covers the other end side of the first bearing 33 in the rotation axis C direction. The outer circumferential edge of the annular flange portion 422 is located inward (inner circumferential side) in the radial direction of the rotor 3 relative to the permanent magnet portion 31. In other words, the first bearing storing portion 42 is formed so as not to overlap with the permanent magnet portion 31 as viewed from the rotation axis C direction of the rotor 3.

Specifically, the first bearing storing portion 42 (bearing house portion of the bracket 41) is disposed inward (inner diameter side) in the radial direction of the rotor 3 relative to the permanent magnet portion 31, as viewed from the rotation axis C direction. Further, the outer circumferential edge portion (edge portion on the outer diameter side) of the flange portion 422 of the first bearing storing portion 42 (bearing house portion) is covered with resin that is a non-magnetic substance. Specifically, in the bracket 41, the outer circumferential edge portion of the flange portion 422 of the first bearing storing portion 42 is covered with the non-magnetic portion 44 made of resin.

As described above, the bracket 41 is formed by the first bearing storing portion (magnetic portion) 42, which is one of the pair of bearing storing portions (bearing house portions), and the non-magnetic portion 44 (end surface portion). The first bearing storing portion (magnetic portion) 42 is disposed on the inner diameter side relative to the permanent magnet portion 31 in the radial direction of the rotor 3, and thus can prevent the flange portion 422 of the first bearing storing portion 42 serving as a magnetic portion from facing the permanent magnet portion 31 in the rotation axis C direction. This makes it possible to suppress a leakage flux flowing from the permanent magnet portion 31 to the first bearing storing portion (magnetic portion) 42. Furthermore, in the first bearing storing portion (magnetic portion) 42, the outer circumferential edge portion of the flange portion 422, which is disposed close to the permanent magnet portion 31 of the rotor 3, is covered with the non-magnetic portion 44. This makes it possible to block the path of the leakage flux flowing from the permanent magnet portion 31 to the first bearing storing portion (bearing house portion) 42 formed of a magnetic substance by the non-magnetic portion 44 formed of a non-magnetic substance, and thus further possible to suppress the leakage flux flowing from the permanent magnet portion 31 to the first bearing storing portion 42.

Note that such a structure for suppressing the leakage flux can be applied to not only the first bearing storing portion 42 side but also the second bearing storing portion 43 side. At that time, the second bearing storing portion 43 is formed into the shape similar to that of the first bearing storing portion 42 and includes a tubular portion 431 that holds the outer race side of the second bearing 34 from the radial direction, an annular flange portion 432 that extends outward in the radial direction of the rotor 3 from one end portion of the tubular portion 431 in the rotation axis C direction, and a coronal portion 433 that extends inward in the radial direction from the other end portion of the tubular portion 431 in the rotation axis C direction. Additionally, the second bearing storing portion 43 is disposed on the inner diameter side relative to the permanent magnet portion 31 in the radial direction of the rotor 3. Further, the outer circumferential edge portion of the flange portion 432 of the second bearing storing portion 43 is covered with the end surface portion 13 (connection portion 14) of the resin motor shell 10 that is a non-magnetic substance. This makes it possible to suppress the leakage flux flowing from the permanent magnet portion 31 to the second bearing storing portion 43.

The non-magnetic portion (end surface portion) 44 of the bracket 41 includes the connection portion 45 connected to the first bearing storing portion (bearing house portion) 42. The connection portion 45 is formed into a substantially tubular shape, and the flange portion 422 of the first bearing storing portion (bearing house portion) 42 is inserted into and fixed to the side surface of the tubular connection portion 45 on the inner diameter side. Here, the tubular portion 421 of the first bearing storing portion 42 is not in contact with the non-magnetic portion 44 of the bracket 41 (is not covered with the non-magnetic portion 44), and only the outer circumferential edge portion of the flange portion 422 is joined (connected) to the connection portion 45 of the non-magnetic portion 44 so as to be covered therewith. Further, a clearance portion (air gap) AG1 is formed between the tubular portion 421 of the first bearing storing portion 42 and the tubular connection portion 45 of the non-magnetic portion 44. With this configuration, the deformation of the motor shell 10 due to heat, shock, or the like hardly affects the first bearing 33. Furthermore, the contact area between the connection portion 45 of the bracket 41 and the flange portion 422 of the first bearing storing portion 42 can be reduced, and thus the heat generated at the winding wound in the stator core 21 can be prevented from being transmitted to the first bearing 33 via the bracket 41. This makes it possible to suppress an increase in temperature of the first bearing 33 and prevent the first bearing 33 from deteriorating.

In this embodiment, the second bearing storing portion 43, which is the other one of the pair of bearing storing portions, also has the structure similar to that of the first bearing storing portion 42. Specifically, the motor shell 10 is formed into a bottomed cylindrical shape and includes the annular portion 12 of the motor shell 10, which is integrally formed with the stator 2, and the end surface portion 13 of the motor shell 10, which is connected to the end portion of the annular portion 12 and expands inward (inner circumferential side) in the radial direction. Additionally, the end surface portion 13 of the motor shell 10 includes the cylindrical connection portion 14 connected to the second bearing storing portion 43. Further, similarly to the first bearing storing portion 42, the second bearing storing portion 43, which is the other one of the pair of bearing storing portions, includes the tubular portion 431 and the flange portion 432 extending outward in the radial direction from the tubular portion 431, and only the outer circumferential edge portion of the flange portion 432 is inserted into and fixed to the side surface of the connection portion 14 of the resin shell (motor shell 10) on the inner diameter side. Further, a clearance portion (air gap) AG2 is formed between the tubular portion 431 of the second bearing storing portion 43 and the connection portion 14 of the resin shell (motor shell 10).

With this configuration, the deformation of the motor shell 10 due to heat, shock, or the like hardly affects the second bearing 34. Furthermore, the contact area between the connection portion 14 of the motor shell 10 and the flange portion 432 of the second bearing storing portion 43 can be reduced, and thus the heat generated at the winding wound in the stator core 21 can be prevented from being transmitted to the second bearing 34 via the resin shell 10. This makes it possible to suppress an increase in temperature of the second bearing 34 and prevent the second bearing 34 from deteriorating.

Further, as described above, the rotor 3 includes the coupling portion 35, to which the shaft 32 is fixed and which couples the permanent magnet portion 31 and the shaft 32 to each other. The permanent magnet portion 31 is disposed so as to face the cylindrical stator core 21 in the radial direction. The coupling portion 35 is disposed on the inner diameter side of the permanent magnet portion 31 annularly disposed. As shown in FIGS. 2 and 4, the coupling portion 35 includes a recess 36 that is recessed toward the center of the coupling portion 35 in the axis direction of the rotation axis C (rotation axis C direction). The recess 36 is formed such that the thickness of the coupling portion 35 in the rotation axis C direction at the position at which the recess 36 is formed is smaller than the thickness of the permanent magnet portion 31 in the rotation axis C direction. Additionally, the flange portion 422 of the first bearing storing portion 42 is disposed so as to overlap with the recess 36 in the rotation axis C direction. This makes it possible to form the annular recess 36 recessed toward the rotation axis C direction in the rotor 3, so that the flange portion 422 of the first bearing storing portion 42 can be disposed within the recess 36.

In such a manner, a part of the first bearing storing portion 42 (flange portion 422) enters the annular recess 36 recessed in the axis direction of the rotation axis C, thus reducing the thickness of the permanent magnet electric motor 1 in the rotation axis C direction and downsizing the permanent magnet electric motor 1 in the rotation axis C direction.

As shown in FIG. 4, terminal pins 26 electrically connected to the winding (not shown) of the stator core 21, and bosses 27 each serving as a guide used when a substrate (not shown) is attached are provided at the end portion (upper end portion in FIG. 4) of the stator 2 on the opposite output side in the rotation axis C direction.

The bracket 41 functions as an insulation cover for preventing the terminal pins 26 from being exposed to the outside of the permanent magnet electric motor 1. In this embodiment, the terminal pins 26 are provided at three positions, and the bracket 41 is attached to the motor shell 10 so as to cover up those three positions.

The bracket 41 includes a cover main body 414 to be attached along the upper end surface of the stator 2 and a fitting portion 415 integrally formed with the cover main body 414. The cover main body 414 and the fitting portion 415 correspond to the non-magnetic portion 44 (end surface portion).

The cover main body 414 is formed into a circular plate shape as a whole. As shown in FIG. 3, the fitting portion 415 is formed as an annular projection disposed at the outer circumferential edge portion of the cover main body 414. The fitting portion 415 is fitted into the end portion of the motor shell 10 on the opposite output side (upper end surface of the motor shell 10 in FIG. 4) from the rotation axis C direction, so that the motor shell 10 (main body) and the bracket 41 are aligned with each other, and the first bearing 33 is stored in the first bearing storing portion 42 of the bracket 41 as shown in FIG. 2.

The motor shell 10 includes the three guard portions 102 arranged at regular intervals in the circumferential direction at the end portion of the rotation axis C on the opposite output side. Note that any number of guard portions 102, such as two or six guard portions 102, may be provided, and the plurality of guard portions 102 need not be arranged at regular intervals. Those three guard portions 102 each protrude into a trapezoidal shape in the radial direction of the stator 2 (permanent magnet electric motor 1) and each have a predetermined thickness in the rotation axis C direction.

As shown in FIGS. 1 and 4, each guard portion 102 includes a cutout portion 104 for fitting a vibrationproof rubber bush 6 thereinto, the cutout portion 104 being formed from the outside in the radial direction of the stator 2 (permanent magnet electric motor 1) to the inner radial direction. This cutout portion 104 is formed so as to connect a hole formed in each guard portion 102 to penetrate in the rotation axis C direction and the outer circumferential edge of the guard portion 102 to each other. Furthermore, each guard portion 102 includes the screw hole 103, through which the above-mentioned bracket 41 is screwed.

The lower surface (surface on the output side) of each guard portion 102 includes a circular recess portion 106 formed to easily hold the vibrationproof rubber bush 6 (see FIGS. 1 and 4).

As shown in FIG. 4, any one of the three guard portions 102 includes a slitted groove 105 for arranging the electrically conductive member 5 for measures against electrolytic corrosion (see FIG. 5) along the rotation axis C direction, the slitted groove 105 being formed from the position on the most inner diameter side of the cutout portion 104 in the radial direction of the stator 2 (permanent magnet electric motor 1) toward the rotation axis C. Along this slitted groove 105, a slitted groove for the electrically conductive member 5 is also formed on the side surface and the end surface portion 13 (surface on the output side) of the motor shell 10 so as to extend in the axis direction of the rotation axis C and the radial direction (not shown).

The electrically conductive member 5 is a strip-shaped member for electrical conduction between the first bearing 33 and the second bearing 34. The electrically conductive member 5 is formed by, for example, punching a steel plate into a strip shape and bending the obtained steel plate into a squared U shape along the outer surfaces of the motor shell 10 and the bracket 41 (see FIG. 5). The electrically conductive member 5 allows the potentials of the first bearing 33 and the second bearing 34 on the outer race side to be the same, and thus the generation of electrolytic corrosion can be suppressed.

Here, when the bracket 41 is fitted into the motor shell 10, the slitted groove 416 of the bracket 41 and the slitted groove 105 formed in the outer surface of the motor shell 10 become continuous, and both the slitted grooves become a guide into which the strip-shaped electrically conductive member 5 is to be embedded. This makes it possible to prevent the strip-shaped electrically conductive member 5 from protruding from the surface of the shell of the permanent magnet electric motor 1 and from dropping. As shown in FIG. 5, the electrically conductive member 5 is disposed to extend from the position of the flange portion 422 of the first bearing storing portion 42 to the position of the flange portion 432 of the second bearing storing portion 43 through the slitted groove 416 of the bracket 41, the slitted groove 105 of the guard portion 102, and the slitted groove of the outer circumferential surface of the motor shell 10.

Further, before the vibrationproof rubber bush 6 is fitted into the guard portion 102, the electrically conductive member 5 is inserted into the slitted groove 105 in advance, so that the vibrationproof rubber bush 6 can press the electrically conductive member 5 from the outside, and the electrically conductive member 5 can be prevented from dropping.

As described above, in this embodiment, the bearing house portions (first bearing storing portion 42, second bearing storing portion 43) each formed of a magnetic substance are disposed so as not to face the annular permanent magnet portion 31 in the rotation axis C direction. Additionally, the outer circumferential edge portion of the flange portion 422 of the bearing house portion 42 is covered with the non-magnetic portion 44 formed of a non-magnetic substance so as not to generate the path of the magnetic flux, which short-circuits between the bearing house portions 42 and 43 and the rotor 3 (permanent magnet portion 31) in the radial direction of the stator 2 (permanent magnet electric motor 1).

This makes it possible to suppress the generation of a leakage flux by blocking the path of the leakage flux flowing from the permanent magnet portion 31 to the bearing house portions 42 and 43 even if the bearing house portion 42 is disposed close to the permanent magnet portion 31 in the axis direction of the rotation axis C (rotation axis C direction). Further, since the bearing house portion 42 can be disposed close to the permanent magnet portion 31 in the axis direction of the rotation axis C (rotation axis C direction), so that the permanent magnet electric motor 1 can be downsized in the axis direction of the rotation axis C.

REFERENCE SIGNS LIST 1 permanent magnet electric motor
10 motor shell (main body)
12 annular portion
13 end surface portion
2 stator
21 stator core
3 rotor
31 permanent magnet portion (magnetized portion)
32 shaft
33 first bearing
34 second bearing
35 coupling portion
36 recess
41 bracket
42 first bearing storing portion (bearing house portion)
421 tubular portion
422 flange portion
423 coronal portion
43 second bearing storing portion (bearing house portion)
44 non-magnetic portion (end surface portion)
45 connection portion
AG1, AG2 clearance portion (air gap)
C rotation axis

The invention claimed is:

1. An inner rotor permanent magnet electric motor, comprising:
   a columnar rotor including a permanent magnet portion annularly disposed;
   a shaft fixed to the rotor along a rotation axis of the rotor;
   a cylindrical stator core disposed on an outer circumferential side of the rotor;
   a main body including a shell integrally formed with the stator core;
   a bracket attached to one end side of the main body and formed having a gap between the bracket and the rotor in an axial direction of the rotation axis; and
   a bearing that rotatably supports the shaft, wherein
   the bracket includes a magnetic bearing house portion that stores the bearing, and a non-magnetic portion that is connected to the bearing house portion,
   the bearing house portion includes a tubular portion and a flange portion extending outward in a radial direction from one end side of the tubular portion,
   an outer circumferential edge portion of the flange portion of the bearing house portion is disposed on an inner diameter side relative to the permanent magnet portion as viewed from an axis direction of the rotation axis, and is covered with the non-magnetic portion, and
   the tubular portion of the bearing house portion and the non-magnetic portion of the bracket are disposed opposite each other in a radial direction perpendicular to the axial direction, and a clearance portion is formed between the tubular portion and the non-magnetic portion.

2. The inner rotor permanent magnet electric motor according to claim 1, wherein the bearing includes a first bearing fixed to one end side of the shaft and a second bearing fixed to an other end side of the shaft, the bearing house portion includes a first bearing house portion that stores the first bearing and a second bearing house portion that stores the second bearing, the bracket includes the first bearing house portion, and a non-magnetic portion that is connected to the first bearing house portion, an outer circumferential edge portion of the flange portion of the first bearing house portion is disposed on an inner diameter side relative to the permanent magnet portion as viewed from an axis direction of the rotation axis, and is covered with the non-magnetic portion, the tubular portion of the first bearing house portion and the non-magnetic portion of the bracket are disposed opposite each other in a radial direction perpendicular to the axial direction, and a clearance portion is formed between the tubular portion and the non-magnetic portion, the main body includes an annular portion integrally formed with the stator core, and an end surface portion formed of a non-magnetic substance is connected to an end portion of the annular portion and expands inward in the radial direction from the annular portion, the end surface portion includes a connection portion connected to the second bearing house portion, an outer circumferential edge portion of a second flange portion of the second bearing house portion is disposed on an inner diameter side relative to the permanent magnet portion as viewed from an axis direction of the rotation axis, and is covered with the non-magnetic portion, and the tubular portion of the second bearing house portion and the non-magnetic portion of the bracket are disposed opposite each other in a radial direction perpendicular to the axial direction, and a clearance portion is formed between the tubular portion and the non-magnetic portion.

3. The inner rotor permanent magnet electric motor according to claim 2, wherein the permanent magnet portion of the rotor faces the stator core in the radial direction, the rotor further includes a coupling portion that couples the permanent magnet portion and the shaft to each other, the coupling portion includes an annular recess that is disposed on an inner diameter side of the permanent magnet portion and is recessed toward a center of the coupling portion in the axis direction, and the flange portion of the bearing house portion is disposed to overlap with the recess in the axis direction.

4. The inner rotor permanent magnet electric motor according to claim 3, wherein the permanent magnet portion is a bonded magnet.

5. The inner rotor permanent magnet electric motor according to claim 2, wherein the permanent magnet portion is a bonded magnet.

6. The inner rotor permanent magnet electric motor according to claim 1, wherein the permanent magnet portion is a bonded magnet.

7. The inner rotor permanent magnet electric motor according to claim 1, wherein the bearing includes a first bearing fixed to one end side of the shaft and a second bearing fixed to an other end side of the shaft, the bearing house portion includes a first bearing house portion that stores the first bearing and a second bearing house portion that stores the second bearing, the inner rotor permanent magnet electric motor further includes an electrically conductive member for electrical conduction between the first bearing and the second bearing, and at least one end of the conductive member is disposed in a clearance portion.

8. The inner rotor permanent magnet electric motor according to claim 7, wherein the permanent magnet portion is a bonded magnet.

* * * * *